United States Patent
Itoo et al.

(10) Patent No.: US 8,834,307 B2
(45) Date of Patent: Sep. 16, 2014

(54) BELT TYPE CONTINUOUSLY VARIABLE TRANSMISSION

(75) Inventors: Seiji Itoo, Akashi (JP); Hideaki Kii, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 350 days.

(21) Appl. No.: 13/267,734

(22) Filed: Oct. 6, 2011

(65) Prior Publication Data

US 2013/0090199 A1    Apr. 11, 2013

(51) Int. Cl.
*F16H 57/04*    (2010.01)

(52) U.S. Cl.
CPC ........ *F16H 57/0416* (2013.01); *F16H 57/0489* (2013.01)
USPC .......................................... 474/93

(58) Field of Classification Search
USPC .......................................... 474/93
See application file for complete search history.

(56) References Cited

U.S. PATENT DOCUMENTS

| | | | |
|---|---|---|---|
| 3,766,575 A | 10/1973 | Grengs | |
| 4,697,665 A | 10/1987 | Eastman et al. | |
| 6,338,688 B1 * | 1/2002 | Minami et al. | 474/144 |
| 6,510,912 B1 | 1/2003 | Atsuumi | |
| 6,820,708 B2 | 11/2004 | Nakamura | |
| 6,938,676 B2 | 9/2005 | Lan et al. | |
| 7,303,495 B2 | 12/2007 | Schoenek et al. | |
| 7,562,739 B2 | 7/2009 | Lan et al. | |
| 7,686,123 B2 * | 3/2010 | Ishida | 180/346 |
| 7,717,206 B2 | 5/2010 | Tanaka et al. | |
| 7,771,299 B2 * | 8/2010 | Mochizuki et al. | 474/12 |
| 7,882,911 B2 | 2/2011 | Nobuhira | |
| 7,967,100 B2 | 6/2011 | Cover et al. | |
| 8,002,061 B2 | 8/2011 | Yamamura et al. | |
| 8,091,670 B2 | 1/2012 | Suzuki et al. | |
| 8,256,563 B2 | 9/2012 | Suzuki et al. | |
| 2002/0134598 A1 | 9/2002 | Nakamura et al. | |
| 2003/0066696 A1 * | 4/2003 | Nakamura | 180/68.1 |
| 2004/0195018 A1 | 10/2004 | Inui et al. | |
| 2006/0011401 A1 | 1/2006 | Nakamura et al. | |
| 2006/0270503 A1 | 11/2006 | Suzuki et al. | |
| 2009/0183937 A1 | 7/2009 | Yamamura et al. | |
| 2010/0155170 A1 | 6/2010 | Melvin et al. | |
| 2010/0167853 A1 * | 7/2010 | Morita | 474/13 |
| 2011/0048828 A1 | 3/2011 | Sunsdahl et al. | |
| 2011/0220429 A1 | 9/2011 | Yamamura et al. | |
| 2012/0247846 A1 | 10/2012 | Ichikawa | |
| 2012/0289370 A1 | 11/2012 | Yamanishi et al. | |

OTHER PUBLICATIONS

Itoo, Seiji et al., "Belt-Type Continuously Variable Transmission" U.S. Appl. No. 13/267,721, filed Oct. 6, 2011, 28 pages.
Itoo, Seiji et al., "Utility Vehicle" U.S. Appl. No. 13/269,341, filed Oct. 7, 2011, 23 pages.
Itoo, Seiji et al., "Utility Vehicle" U.S. Appl. No. 13/269,361, filed Oct. 7, 2011, 30 pages.

* cited by examiner

*Primary Examiner* — William E Dondero
*Assistant Examiner* — Mark K Buse
(74) *Attorney, Agent, or Firm* — Alleman Hall McCoy Russell & Tuttle LLP

(57) ABSTRACT

A belt-type continuously variable transmission comprises a drive pulley assembly mounted to a drive shaft; a driven pulley assembly mounted to a driven shaft; a belt connecting the two; and a case assembly for accommodating these components. The drive pulley assembly has fins for generating a flow of air moving toward an outer periphery of the drive pulley assembly. When viewed in an axial direction of the drive shaft, an air blocking plate is positioned at a forward side in a rotational direction of the drive pulley assembly relative to an imaginary line segment connecting a center axis of the drive pulley assembly to a center axis of the driven pulley assembly, between the drive pulley assembly and the driven pulley assembly such that the air blocking plate surrounds the outer periphery of the drive pulley assembly over a predetermined range.

10 Claims, 7 Drawing Sheets

BELT TYPE CONTINUOUSLY VARIABLE TRANSMISSION

BACKGROUND OF THE INVENTION

1. Field of the Invention

The present invention relates to a belt-type continuously variable transmission incorporated into a vehicle. Particularly, the present invention relates to a cooling structure of the belt-type continuously variable transmission.

2. Description of the Related Art

United States Patent Application Publication No. 2010/0167853 discloses a cooling structure of a conventional V-belt-type continuously variable transmission (CVT) built into a utility vehicle. In the continuously variable transmission disclosed in this literature, a fixed sheave of a drive pulley and a fixed sheave of a driven pulley are provided with fins which function as centrifugal fans, and air introduced from outside into a case is flowed through the drive pulley and then the driven pulley, thereby cooling these pulleys and a V-belt.

An air-intake duct is mounted to the peripheral wall of the case surrounding the drive pulley. Outside air suctioned through the air-intake duct is guided to an air entrance closer to a center of the drive pulley, and is blown toward the outer periphery of the drive pulley as cooling air. Then, the cooling air is guided to an air entrance closer to the center of a driven pulley by an air guide member provided between the drive pulley and the driven pulley, the cooling air is blown toward the outer periphery of the driven pulley, and then the cooling air is discharged through an air discharge duct which opens the peripheral wall of the case.

However, in the above conventional continuously variable transmission, the flow of the cooling air blowing toward the outer periphery of the drive pulley and the flow of the cooling air blowing toward the outer periphery of the driven pulley interfere with each other in a complex manner inside a narrow space of the case. Therefore, it is difficult to form a flow of the cooling air directed from the drive pulley toward the driven pulley as intended.

SUMMARY OF THE INVENTION

The present invention addresses the above described problem, and an object of the present invention is to improve an overall cooling efficiency by flowing cooling air blowing toward the outer periphery of a drive pulley assembly smoothly toward a driven pulley assembly while suppressing interference with a flow of the cooling air in the vicinity of the driven pulley assembly.

According to the present invention, a belt-type continuously variable transmission comprises a drive pulley assembly mounted to a drive shaft; a driven pulley assembly mounted to a driven shaft; a belt wrapped around the drive pulley assembly and the driven pulley assembly; and a case assembly for accommodating the drive pulley assembly, the driven pulley assembly, and the belt; wherein the drive pulley assembly has fins for generating a flow of air moving toward an outer periphery of the drive pulley assembly according to rotation of the drive pulley assembly; the case assembly includes a peripheral wall portion surrounding the drive pulley assembly, the driven pulley assembly, and the belt; and when viewed in an axial direction of the drive shaft, an air blocking plate is positioned at a forward side in a rotational direction of the drive pulley assembly relative to an imaginary line segment connecting a center axis of the drive pulley assembly to a center axis of the driven pulley assembly, between the drive pulley assembly and the driven pulley assembly such that the air blocking plate surrounds the outer periphery of the drive pulley assembly over a predetermined range.

In the above configuration, when the drive pulley assembly and the driven pulley assembly start to rotate according to, for example, the operation of the vehicle in the belt-type continuously variable transmission, there is generated a flow of cooling air moving toward the outer periphery of the drive pulley assembly, by the fins, in the vicinity of the drive pulley assembly. The flow of the cooling air is blown to the outer periphery of drive pulley assembly. A part of the flow of the cooling air which is going to collide against the flow of the air in the vicinity of the driven pulley assembly adjacent to the drive pulley assembly, is blocked by the air blocking plate, and flows in the rotational direction of the drive pulley assembly in the vicinity of the drive pulley assembly.

In this configuration, it is possible to suppress interference between the flow of the cooling air generated in the vicinity of the drive pulley assembly and the flow of the air generated in the vicinity of the driven pulley assembly, and intensify the flow of the cooling air in the vicinity of the drive pulley assembly. The intensified flow of the cooling air moves toward the driven pulley assembly along the peripheral wall portion of the case assembly, and joins the flow of the air in the vicinity of the driven pulley assembly smoothly. Therefore, cooling efficiency of the drive pulley assembly, the driven pulley assembly, and the belt can be enhanced.

The above and further objects, features and advantages of the invention will more fully be apparent from the following detailed description with reference to the accompanying drawings.

DETAILED DESCRIPTION OF THE PREFERRED EMBODIMENTS

Figure 1:
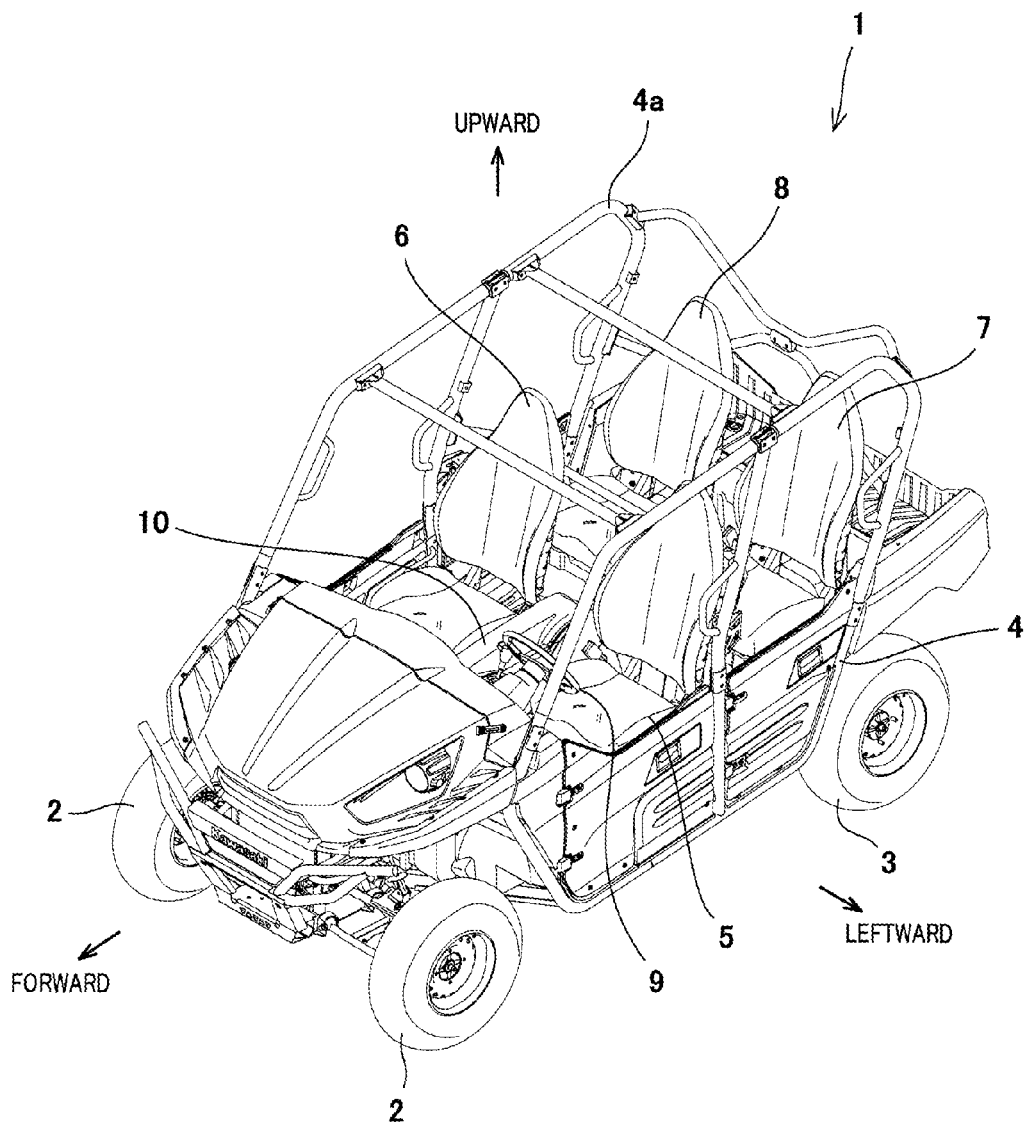
FIG. 1 is a perspective view showing an external appearance of a utility vehicle according to an embodiment of the present invention.

Hereinafter, an embodiment of the present invention will be described with reference to the drawings. Throughout the drawings, the same or corresponding components are identified by the same reference numerals and will not be described in repetition. The stated directions are referenced from the perspective of a driver riding in a utility vehicle.

FIG. 1 is a perspective view showing an external appearance of the utility vehicle 1 (vehicle) according to an embodiment of the present invention. For example, the utility vehicle 1 is intended for four persons and has four wheels. The utility vehicle 1 includes a pair of right and left front wheels 2, a pair of right and left rear wheels 3, a vehicle body frame 4, a driver seat 5, a passenger seat 6, a left rear seat 7, and a right rear seat 8. The front wheels 2 are suspended from the front portion of the vehicle body frame 4, while the rear wheels 3 are suspended from the rear portion of the vehicle body frame 4. The four seats 5~8 are mounted on the vehicle body frame 4, and are arranged between the front wheels 2 and the rear wheels 3 in a forward and rearward direction.

The vehicle body frame 4 has a cabin frame (ROPS) 4a surrounding a cabin for passengers. The driver seat 5 and the passenger seat 6 are arranged side by side in a rightward and leftward direction in a front-half portion inside the cabin which is defined by the cabin frame 4a. Although the driver seat 5 is located at the left and a steering wheel 9 steered by the driver is disposed in front of the driver seat 5 in the present embodiment, they may be located at the right. The left rear seat 7 and the right rear seat 8 are arranged side by side in a rear-half portion inside the cabin. A console box 10 is provided between the driver seat 5 and the passenger seat 6, and positioned at a substantially center region inside the cabin.

Figure 2:
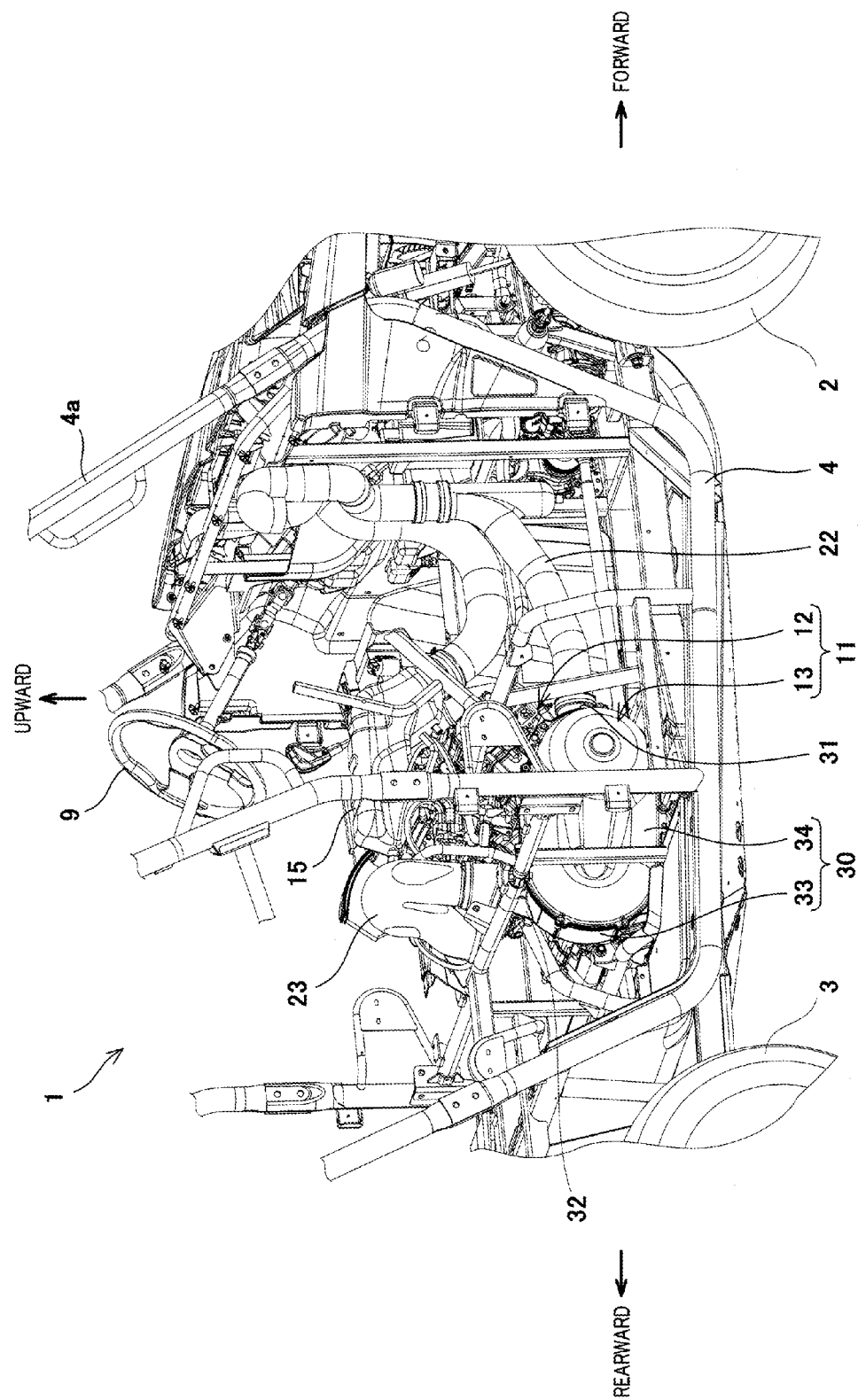
FIG. 2 is a perspective view of the utility vehicle, showing an engine unit when viewed from rightward and slightly obliquely rearward, in a state where a part of components are omitted from the utility vehicle.

FIG. 2 shows an engine unit 11 of the utility vehicle 1 when viewed from rightward and slightly obliquely rearward, in a state where a part of the components such as the driver seat 5, the passenger seat 6, the console box 10, etc., are omitted from the utility vehicle 1. In the utility vehicle 1 of the present embodiment, the engine unit 11 is accommodated into the console box 10. As shown in FIG. 2, the engine unit 11 is positioned at a substantially center region inside the cabin. The engine unit 11 is an assembly including an engine 12 and a transmission 13 which are unitarily (integrally) coupled together. Although not shown, the transmission 13 is coupled with propeller shafts, differentials, etc., to allow a driving power of the engine 12 to be transmitted to the front wheels 2 and to the rear wheels 3.

Figure 3:
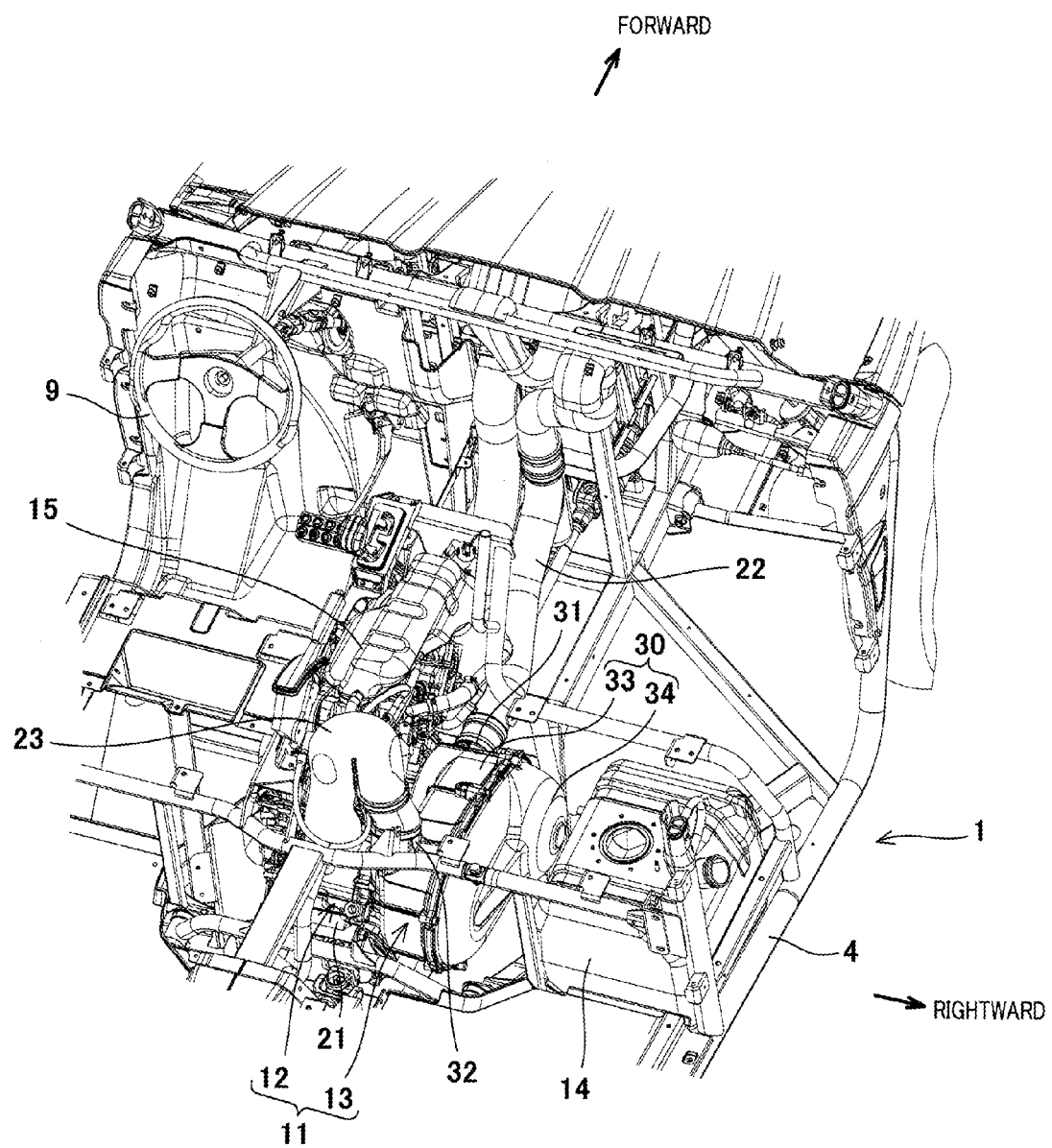
FIG. 3 is a perspective view showing the engine unit when viewed from above, rightward and obliquely rearward.

When viewed from above, slightly rightward and obliquely rearward in FIG. 3, in the engine unit 11, the transmission 13 is positioned at a right side of a crankcase 21 of the engine 12. As described later with reference to FIG. 5, and others, a drive shaft 41 which is an input shaft of the transmission 13 is coupled to a crankshaft 20 via a centrifugal clutch 26. At the right side of the transmission 13, a fuel tank 14 (not shown in FIG. 2) is positioned such that the fuel tank 14 is spaced apart from the transmission 13 to allow a transmission cover 34 to be detached for the purpose of maintenance. In FIGS. 2 and 3, reference symbol 15 designates an air-intake chamber disposed above the engine 12.

As shown in FIGS. 2 and 3, a case 30 (case assembly: hereinafter referred to as a transmission case 30) of the transmission 13 has a substantially elongated-circle shape when viewed from the side. An air inlet 31 of a substantially cylindrical shape protrudes from a front portion of a peripheral wall extending along a periphery of the case 30 in a forward and rearward direction and in an upward and downward direction, and a rear end portion of an air-intake duct 22 is coupled to the air inlet 31. The air-intake duct 22 extends forward inside the console box 10 (see FIG. 1) and then is bent in front of a dash panel (not shown). The air-intake duct 22 extends upward, and then its upper end portion is curved rearward. After that, the air-intake duct 22 opens downward. Since the air-intake duct 22 opens at a relatively high position in this way, it is possible to sufficiently suppress rain water or muddy water from flowing into the air-intake duct 22.

An air outlet 32 protrudes from the rear end portion of the upper portion of the peripheral wall of the transmission case 30, and a lower end portion of an air discharge duct 23 is coupled to the air outlet 32. The air discharge duct 23 extends upward, and then is bent back in a vicinity of an upper wall of the console box 10 (see FIG. 1) inside thereof. Then, the air discharge duct 23 extends downward, and its lower end portion opens downward and slightly obliquely rearward. In this way, since the uppermost portion of the air discharge duct 23 is positioned substantially as high as the console box 10, the rain water or muddy water is less likely to enter the transmission case 30, after it has flowed into the air discharge duct 23.

—Overall Configuration of Transmission—

Figure 4:
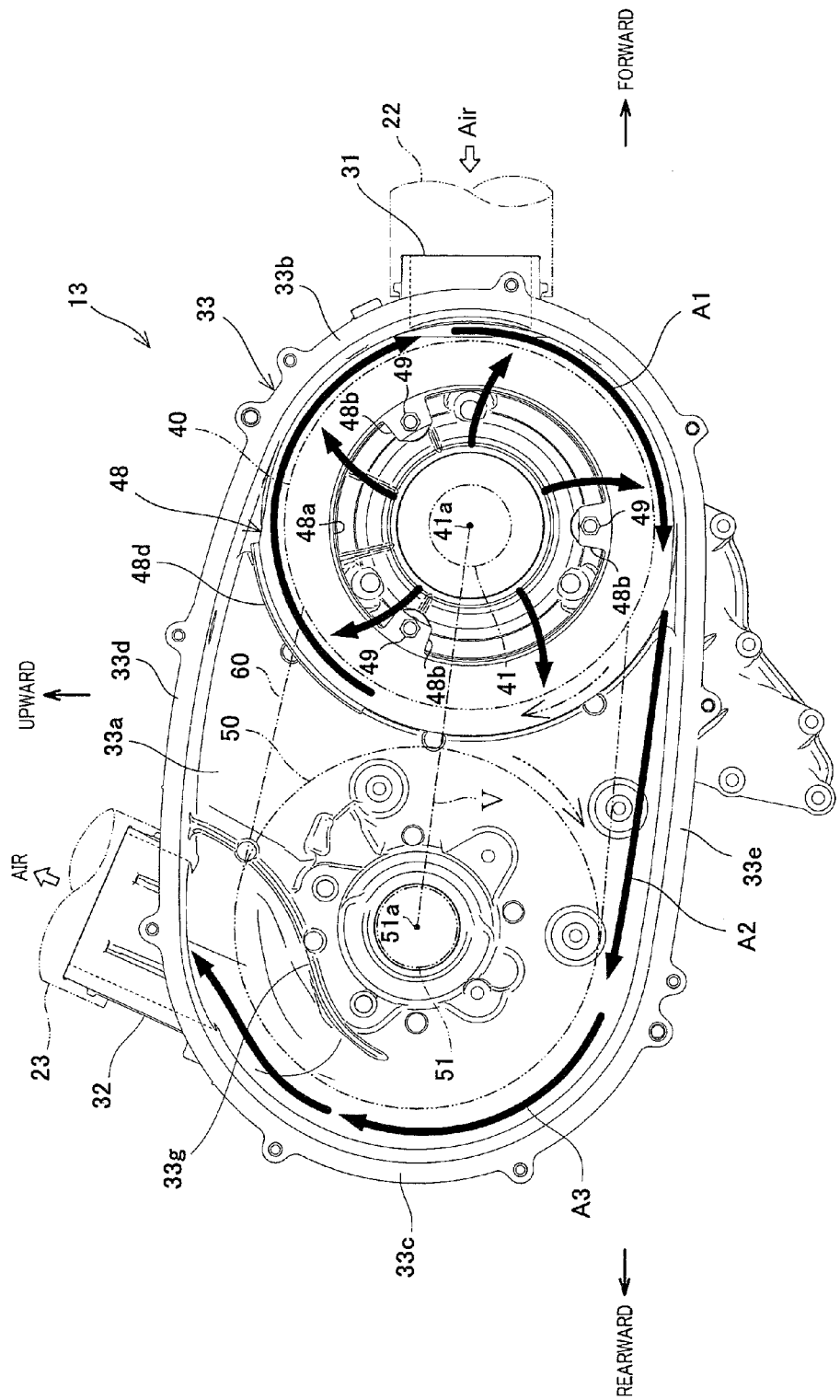
FIG. 4 is a view showing a flow of cooling air in an interior of a case of a transmission.
Figure 5:
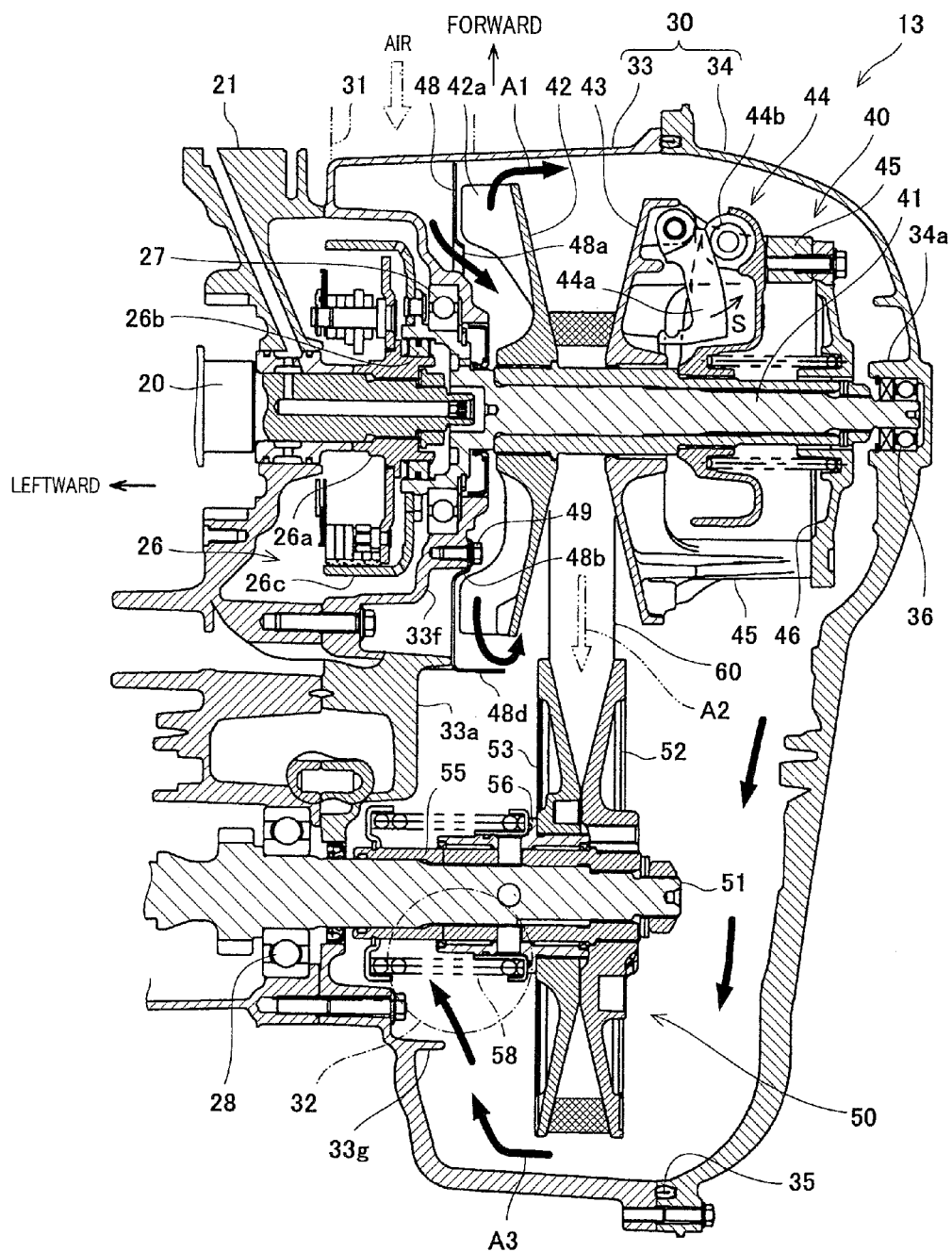
FIG. 5 is a cross-sectional view showing a structure of the transmission.
Figure 6A:
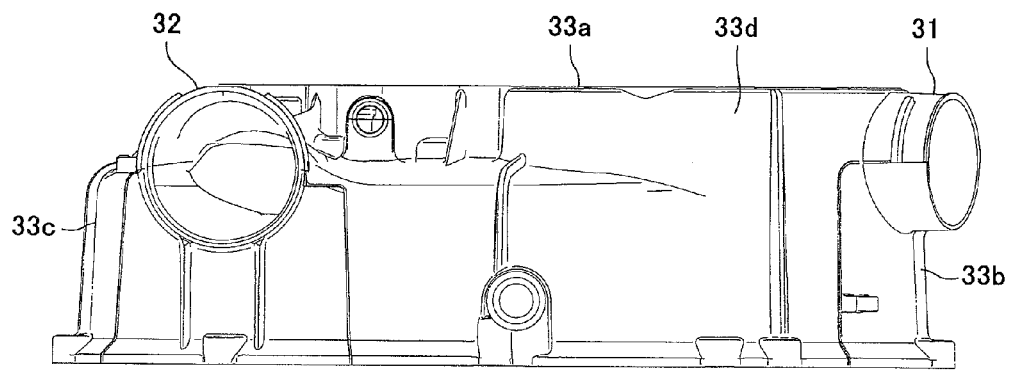
FIG. 6A is a plan view showing a case body when viewed from above.
Figure 6B:
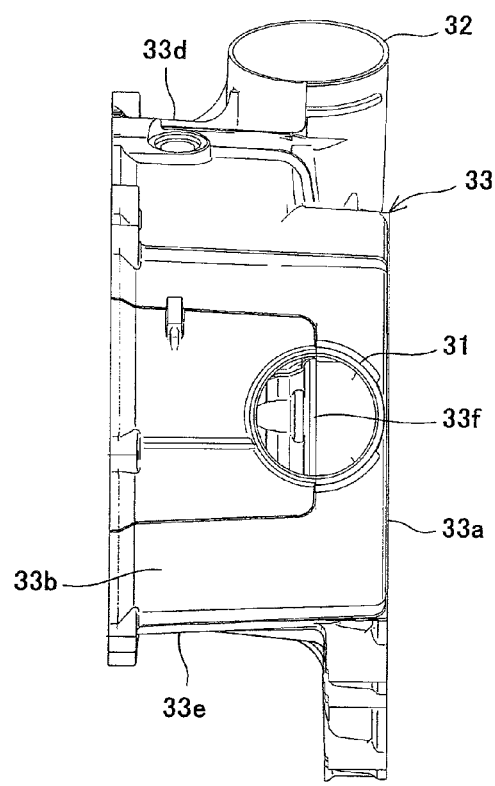
FIG. 6B is a front view showing the case body when viewed from forward.

Next, the structure of the transmission 13 will be described in detail with reference to FIGS. 4 to 6. FIG. 4 is a view showing a flow of cooling air in the interior of the transmission case 30. FIG. 5 is a cross-sectional view showing the internal structure of the transmission 13. FIG. 6A is a plan view showing a case body of the transmission case 30 when viewed from above. FIG. 6B is a front view showing the case body when viewed from forward. Hereinafter, the forward and rearward direction, and the rightward and leftward direction are referenced in the state where the transmission 13 is incorporated into the utility vehicle 1.

As shown in FIGS. 4 and 5, in the present embodiment, the transmission 13 is a V-belt-type continuously variable transmission, and accommodates a drive pulley 40 (drive pulley assembly) and a driven pulley 50 (driven pulley assembly) which are arranged at the front and at the rear, respectively, inside the transmission case 30 which is elongated in the forward and rearward direction. As shown in FIG. 5, the drive pulley 40 is mounted to a drive shaft 41 which is the input shaft, while the driven pulley 50 is mounted on a driven shaft 51 which is the output shaft. A V-belt 60 is wrapped around the pulleys 40 and 50. As described later, a radius (effective diameter) of each of the pulleys 40 and 50 around which the V-belt 60 is wrapped is changed, thereby changing a transmission ratio continuously.

As shown in FIGS. 2 and 3 in addition to FIG. 5, the transmission case 30 includes a body member 33 (hereinafter referred to as a transmission case body 33) fastened to a crankcase 21 (reference symbol 21 appears only in FIGS. 3 and 5) of the engine 12 such that a bottom wall portion 33a faces to the left, and a cover 34 (hereinafter referred to as a transmission cover 34) joined to a right opening of the transmission case body 33. The transmission case body 33 and the transmission cover 34 are made of, for example, aluminum alloy, and a trim seal 35 (shown in only FIG. 5) made of an elastic material intervenes between a portion of transmission case body 33 and a portion the transmission cover 34 which are joined together. The transmission case body 33 has peripheral wall portions 33b~33e extending vertically upward at the right from the outer peripheral edge of the bottom wall portion 33a, over the entire periphery.

When viewed from the right side, as shown in FIG. 4, the peripheral wall portions 33b~33e have an elongated-circle shape surrounding an elongated-circle defined by the drive pulley 40, the driven pulley 50 and the V-belt 60 with a predetermined gap between them. To be specific, the peripheral wall portions include the front wall portion 33b (drive-side peripheral wall portion) having a substantially semi-circular shape and surrounding from forward, a portion of the drive pulley 40 corresponding to about a half of its periphery, along its outer periphery, the rear wall portion 33c (driven-side peripheral wall portion) having a substantially semi-circular shape and surrounding from rearward, a portion of the driven pulley 50 corresponding to about a half of its periphery, along its outer periphery, the upper wall portion 33d connecting the front wall portion 33b to the rear wall portion 33c, and the lower wall portion 33e connecting the front wall portion 33b to the rear wall portion 33c (upper wall portion 33d and lower wall portion 33e are a pair of intermediate peripheral wall portions).

As shown in FIGS. 6A and 6B in addition to FIG. 4, the cylindrical air inlet 31 protrudes forward from the front wall portion 33b of the transmission case body 33. As described later, according to the rotation of the drive pulley 40, air is suctioned into an air entrance closer to a center of the drive pulley 40, and thereby outside air is taken into the transmission case body 33 through the air-intake duct 22. The cylindrical air outlet 32 is provided in a range from the upper end of the rear wall portion 33c to the upper wall portion 33d continuous with the rear wall portion 33c in the transmission case body 33. As shown in FIG. 4, the air outlet 32 is tilted upward and obliquely forward, and the air flowing along the periphery of the driven pulley 50 is discharged smoothly into the air discharge duct 23 as described later.

Turning back to FIG. 5, the bottom wall portion 33a of the transmission case body 33 has a portion swelling inward (rightward), in a front portion thereof corresponding to the drive pulley 40, and a clutch cover member 33f is provided within a dented portion formed at a back side (left side) of the swelling portion to accommodate a centrifugal clutch 26 therein. The tip end portion (right end portion) of the crankshaft 20 of the engine 12 penetrates the right side wall of the crankcase 21, protrudes into the clutch cover member 33f and is joined to an inner member 26a of the centrifugal clutch 26 such that the crankshaft 20 is rotatable integrally with the centrifugal clutch 26.

The inner member 26a of the centrifugal clutch 26 is coupled to a clutch housing 26c via a one-way clutch 26b. The clutch housing 26c is rotatable integrally with the drive shaft 41 of the transmission 13, and is rotatably supported on the inner peripheral side of the clutch cover member 33f via a ball bearing 27. Therefore, in a state where the centrifugal clutch 26 can transmit a driving power, the rotation of the crankshaft 20 of the engine 12 (not shown in FIG. 5) is input to the drive shaft 41 via the centrifugal clutch 26.

The rear portion of the bottom wall portion 33a of the transmission case body 33, corresponding to the driven pulley 50, is fastened to the rear portion of the right side wall of the crankcase 21 of the engine 12 (not shown in FIG. 5). The driven shaft 51 is rotatably supported on the right side wall of the crankcase 21 via a ball bearing 28 in a state where the driven shaft 51 penetrates the bottom wall portion 33a of the transmission case body 33 and the right side wall of the rear portion of the crankcase 21. Although not shown in the drawings, the left-half portion of the driven shaft 51 protruding into the crankcase 21 is the input shaft of a gear transmission mechanism, and the output shaft of the gear transmission mechanism is coupled to propeller shafts, differentials, etc., to transmit driving power to the front wheels 2 and to the rear wheels 3.

—Drive Pulley—

The drive pulley 40 includes a fixed sheave 42 fixed to the drive shaft 41, a movable sheave 43 fitted to the drive shaft 41 such that the movable sheave 43 is movable in an axial direction of the drive shaft 41, and a sheave thrust generating mechanism 44 of, for example, a flyweight type. As described above, one end portion (left end portion) of the drive shaft 41 is mounted on the clutch cover member 33f unitarily (integrally) with the housing 26c of the centrifugal clutch 26 via the ball bearing 27. The opposite end portion (right end portion) of the drive shaft 41 is mounted to a boss portion 34a formed on the transmission case cover 34 via a ball bearing 36. That is, the drive shaft 41 is supported by the clutch cover member 33f of the transmission case body 33 and the transmission cover 34 such that its both ends are mounted to the clutch cover member 33f and the transmission cover 34, respectively.

The fixed sheave 42 is fixed to the left end portion of the drive shaft 41, while the movable sheave 43 is fitted to the drive shaft 41 and positioned at the right side of the fixed sheave 42 to face the fixed sheave 42 such that the movable sheave 43 is movable in an axial direction of the drive shaft 41. The V-belt 60 is retained on conical retaining surfaces of the sheaves 42 and 43. When the movable sheave 43 moves on the drive shaft 41 and thereby a distance between the movable sheave 43 and the fixed sheave 42 changes, the position at which the V-belt 60 is retained changes, i.e., the effective diameter of the drive pulley 40 changes. As the distance between the fixed sheave 42 and the movable sheave 43 decreases, the effective diameter increases, while as the distance between the fixed sheave 42 and the movable sheave 43 increases, the effective diameter decreases.

A receiver plate 46 of a rectangular frame shape is joined to the back surface of the movable sheave 43 via a plurality of coupling arms 45 extending to the right. The receiver plate 46 is movable integrally with the movable sheave 43 in the axial direction of the drive shaft 41. The above sheave thrust generating mechanism 44 is provided between the movable sheave 43 and the receiver plate 46. Although not explained in detail, for example, the sheave thrust generating mechanism 44 is configured in such a manner that a plurality of flyweights 44a rotate by a centrifugal force in a direction indicated by an arrow S in FIG. 5, to press a pressure-receiving roller 44b, and the resulting reactive force causes the movable sheave 43 and receiver plate 46 to move to the left (toward the fixed sheave 42). In brief, the sheave thrust generating mechanism 44 generates a thrust to reduce a distance between the fixed sheave 42 and the movable sheave 43 by using the centrifugal force generated by the rotation of the drive pulley 40.

—Driven Pulley—

In the driven pulley 50, the fixed sheave 52 is fixed to the right end portion of the driven shaft 51, while the movable sheave 53 is fitted to the driven shaft 51 and positioned at the left side of the fixed sheave 52 to face the fixed sheave 52 such that the movable sheave 53 is movable in the axial direction of the driven shaft 51. For example, a cam tube 55 having a plurality of spiral cam channels is attached to the outer peripheral surface of the driven shaft 51, and the cam tube 55 and the fixed sheave 52 are rotatable integrally with the driven shaft 51. A sleeve 56 is unitarily (integrally) coupled to the inner peripheral end portion of the movable sheave 53. The sleeve 56 is fitted to the outer peripheral surface of the cam tube 55 such that the sleeve 56 is movable in an axial direction and supports a roller (not shown) movable along the cam channels of the cam tube 55.

The cam channels of the cam tube 55 have a spiral shape extending to the right of the axial direction of the driven shaft 51 as it is closer to a forward side in a rotational direction of the driven shaft 51. Because of this, when the movable sheave 53 receives a rotational force in the forward direction of the rotational direction by a tension of the V-belt 60, a thrust acting in the rightward direction of the axial direction is generated by a cam action performed by the cam channels of the cam tube 55 and the roller. The sleeve 56 is biased to the right (toward the fixed sheave 52) in the driven shaft 51 by a pressure-adjusting spring 58. A pressing force is applied by the sleeve 56 to press the movable sheave 53 against the fixed sheave 52, in addition to the above thrust, thereby keeping a state where the effective diameter of the driven pulley 50 is a maximum diameter as shown in FIG. 5.

In such a configuration, in the transmission 13, when the speed of the rotation of the engine 12 input to the drive shaft 41 increases, and thereby the sheave thrust in the drive pulley 40 increases, a tension of the V-belt 60 increases, and a wedge force of the V-belt 60 applied to the driven pulley 50 increases. Thereby, the movable sheave 53 moves to the left in a spiral shape along the cam channel away from the fixed sheave 52, against the spring force applied by the pressure-adjusting spring 58 and the cam thrust generated by the cam tube 55 and the radius of the portion of the V-belt 60 which is wrapped around the driven pulley 50 decreases. As a result, a speed-reduction ratio of the output rotational speed with respect to the input rotational speed decreases, and a vehicle speed changes continuously from a low-speed to a high-speed.

—Cooling Structure of Transmission—

As described above with reference to FIGS. 4, 6A and 6B, the air inlet 31 is provided on the front wall portion 33b of the transmission case body 33, and outside air is taken into the transmission case body 33 through the air-intake duct 22. In the transmission 13 of the present embodiment, to allow the outside air to be taken into the transmission case body 33, a plurality of fins 42a are radially provided on the back surface (surface at one side in the axial direction of the drive shaft 41, left surface in the present embodiment) of the fixed sheave 42 of the drive pulley 40 and function as a centrifugal fan.

To be specific, as shown in FIG. 5, the plurality of fins 42a are provided on the back surface of the fixed sheave 42 such that they are greater in height (i.e., height of the fins 42a from the back surface of the fixed sheave 42) in a region closer to the outer periphery. According to the rotation of the fixed sheave 42, these fins 42a generate an air flow (indicated by an arrow in FIG. 4) in a direction from the inner periphery toward the outer periphery. A circularly annular air guide plate 48 having a greater outer diameter than the fixed sheave 42 is provided to face the back surface of the fixed sheave 42 in close proximity to a portion of the fins 42a which is closer to the outer periphery.

Figure 7B:
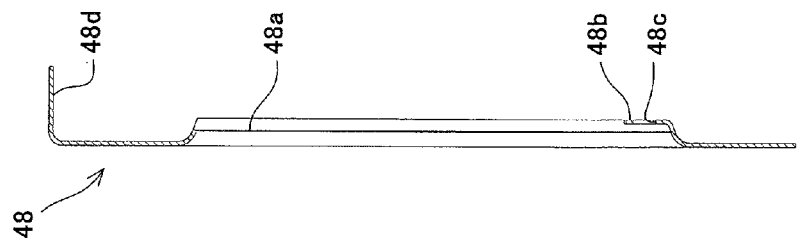
FIG. 7B is a cross-sectional view of the air guide plate taken along B-B of FIG. 7A.
Figure 7A:
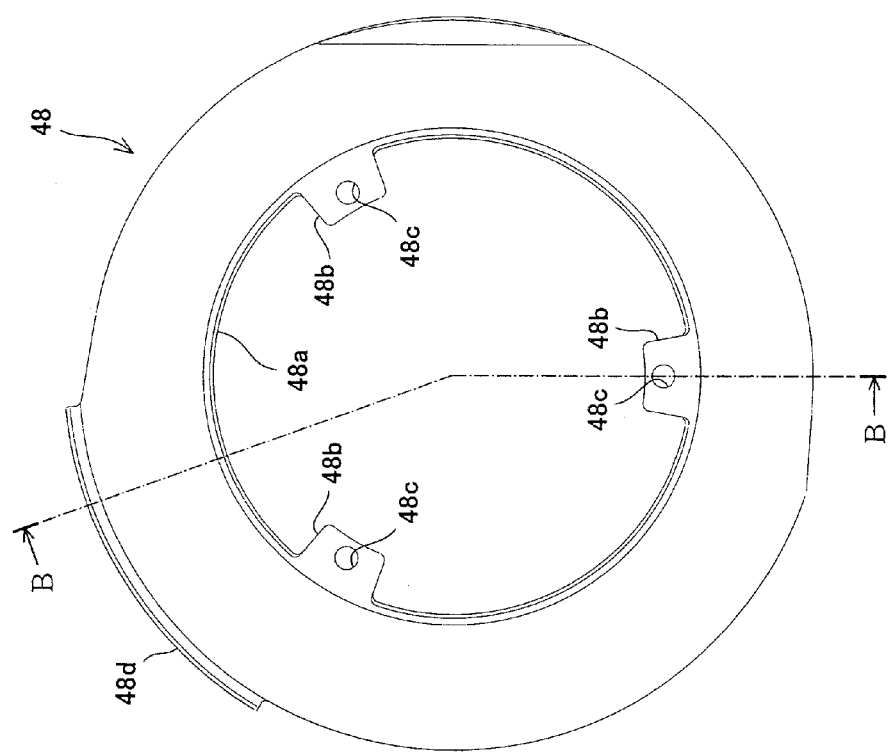
FIG. 7A is a front view of an air guide plate provided inside the case.

As shown in FIGS. 7A and 7B, the air guide plate 48 has a substantially ring-shape formed by, for example, pressing a steel plate by press forming. The air guide plate 48 has a substantially circular opening 48a in a center region thereof. Three projections 48b are provided at the inner peripheral edge of the opening 48a at substantially equal intervals along its periphery. Circular holes 48c open on these projections 48b, respectively. As shown in FIG. 5, bolts 49 are inserted into the holes 48c, respectively, to fasten the projections 48b to the clutch cover member 33f of the transmission case body 33.

At the left side of the air guide plate 48 mounted to the clutch cover member 33f, an annular space is formed so as to surround the clutch cover member 33f. The air inlet 31 opens to face the space. The opening 48a in the center region of the air guide plate 48 surrounds the clutch cover member 33f with a gap between them, thereby forming an air entrance of a substantially circularly annular shape. When the fixed sheave 42 rotates, the air taken into the space through the air inlet 31 flows to a region closer to a center of the fixed sheave 42 through the air entrance and then flows radially toward the outer periphery of the fixed sheave 42, as indicated by arrows shown in FIG. 5 (see FIG. 4).

The air (hereinafter also referred to as cooling air) blowing toward the outer periphery of the fixed sheave 42, i.e., the outer periphery of the drive pulley 40, is directed to flow in the forward direction of the rotational direction of the drive pulley 40 by the front wall portion 33b of the transmission case body 33, facing the front side of the drive pulley 40, and flows downward along the front wall portion 33b. At the rear side of the drive pulley 40, the flow of the cooling air blowing to the outer periphery of the drive pulley 40 may collide against the air flow in the vicinity of the driven pulley 50.

As a solution to this, in the present embodiment, in a region where the flow of the cooling air blowing to the outer periphery of the drive pulley 40 collides against the air flow in the vicinity of the driven pulley 50 adjacent to the drive pulley 40 as described above, an air blocking plate 48d is provided within a predetermined angular range so as to surround at least the outer periphery of the fixed sheave 42 provided with the fins 42a, in the outer periphery of the drive pulley 40. Although in the present embodiment, the air blocking plate 48d is formed by bending the outer periphery of the air guide plate 48 such that the air blocking plate 48d and the air guide plate 48 constitute a unitary member, as shown in FIGS. 5 and 7, an air blocking plate may alternatively be mounted to the transmission case body 33 independently of the air guide plate 48, or otherwise, an air blocking plate may be formed unitarily (integrally) with the transmission case body 33.

As shown in FIG. 4, when the transmission case body 33 is viewed from the right side in a state where the transmission cover 34 is detached (i.e., when the transmission case body 33 is viewed in the axial direction of the drive shaft 41), the air blocking plate 48d is positioned above (i.e., at a forward side in a rotational direction of the drive pulley 40) an imaginary line segment V connecting a rotational center of the drive pulley 40 and a rotational center of the driven pulley 50 (center axis 41a of the drive shaft 41 and center axis 51a of the driven shaft 51), between the drive pulley 40 and the driven pulley 50, and has a circular-arc shape surrounding the outer periphery of the drive pulley 40 over an angular range of approximately 60 degrees to 70 degrees.

To be more specific, the lower end portion of the air blocking plate 48d is positioned slightly above the imaginary line segment V, and the air blocking plate 48d extends to be curved upward and obliquely forward (in the forward direction of the rotational direction of the drive pulley 40). The inclination angle of the air blocking plate 48d with respect to the upper wall portion 33d of the transmission case body 33 gradually decreases as it is closer to the upper wall portion 33d. That is, the upper end portion of the air blocking plate 48d (end portion at the forward side in the rotational direction of the drive pulley 40) gets closer to the upper wall portion 33d of the transmission case body 33 such that it is curved along the upper wall portion 33d.

Because of the above structure, a part of the flow of the cooling air blowing to the outer periphery of the drive pulley 40, which is blocked by the air blocking plate 48d, is caused to flow in the forward direction of the rotational direction of the drive pulley 40 along the air blocking plate 48d. Then, this cooling air flow joins the cooling air flowing along the front wall portion 33b of the transmission case body 33 as described above, and intensifies the flow directed clockwise in FIG. 4 around the drive pulley 40 as indicated by an arrow A1 in FIG. 4.

The intensified flow A1 of the cooling air moves around substantially ¾ of the periphery of the drive pulley 40 and then toward the driven pulley 50 behind the drive pulley 40 along the lower wall portion 33e of the transmission case body 33 as indicated by an arrow A2. Then, the flow of the cooling joins the flow of the air moving in the vicinity of a region below the driven pulley 50. Since the driven pulley 50 has no fins, a relatively weak flow of air moving in the forward direction of the rotational direction of the driven pulley 50 is generated in the vicinity of the driven pulley 50, but a strong flow of air moving to the outer periphery is not generated. Because of this, the flow A2 of the cooling air from the drive pulley 40 is not significantly disturbed.

After the cooling air has joined the flow of the air in the vicinity of the region below the driven pulley 50, it moves so as to draw a curve, along the rear wall portion 33*c* from the lower wall portion 33*e* of the transmission case body 33, in the forward direction of the rotational direction of the driven pulley 50 (indicated by an arrow A3). After that, the cooling air is discharged into the air outlet 32 provided in a range from the upper end (end of the rear wall portion 33*c* at a forward side in the rotational direction of the driven pulley 50) of the rear wall portion 33*c* to the upper wall portion 33*d* continuous with the rear wall portion 33*c* in the transmission case body 33. That is, the flow A3 of the cooling air moves around substantially the half of the periphery of the driven pulley 50, and the cooling air is thereafter discharged.

The air outlet 32 is tilted upward and obliquely forward as described with reference to FIG. 4 and others. In other words, the air outlet 32 extends radially outward relative to the driven pulley 50, from a portion thereof which opens to face the outer periphery of the driven pulley 50 such that the air outlet 32 is tilted in the forward direction of the rotational direction of the driven pulley 50. Because of this, the flow A3 of the cooling air moving in the forward direction of the rotational direction of the driven pulley 50, in the vicinity of the driven pulley 50, is discharged into the air outlet 32 smoothly.

Furthermore, in the present embodiment, to guide the flow A3 of the cooling air in the vicinity of the driven pulley 50, toward the air outlet 32, as described above, a guide rib 33*g* is provided on the bottom wall portion 33*a* of the transmission case body 33. When the guide rib 33*g* is viewed from the right side as shown in FIG. 4 (in the axial direction of the driven shaft 51), a substantially lower half portion corresponding to an upstream side of the flow of the cooling air is gently curved such that it protrudes rearward so as to surround the center axis 51*a* of the driven shaft 51, while a substantially upper half portion corresponding to a downstream side of the flow of the cooling air is gently curved such that it protrudes forward, differently from the lower half portion.

The substantially upper half portion of the guide rib 33*g* has a shape in which the inclination angle of the guide rib 33*g* with respect to the upper wall portion 33*d* of the transmission case body 33 increases gradually as it is closer to the upper wall portion 33*d* gradually in the forward direction (i.e., in the forward direction of the rotational direction of the driven pulley 50). Because of this, the flow of the cooling air moving in the forward direction of the rotational direction of the driven pulley 50 in the vicinity of the driven pulley 50 is guided gradually upward along the curved shape of the guide rib 33*g*, i.e., toward the air outlet 32 of the upper wall portion 33*d* of the transmission case body 33.

Since the air outlet 32 is provided in a range from the rear wall portion 33*c* to the upper wall portion 33*d* in the transmission case body 33, it is expected that warm air is discharged by convection. To be specific, for a certain time period after the utility vehicle 1 stops, and thereby the drive pulley 40 and the driven pulley 50 stop their rotation, high-temperature air inside the transmission case 30 moves upward naturally and is discharged into the air discharge duct 23 through the air outlet 32.

—Operation of Transmission and Cooling Action—

Next, the operation of the transmission 13 in the utility vehicle 1 of the present invention and the flow of the cooling air associated with the operation will be described. In a state where the engine 12 is in a stopped state or in an idle state, the centrifugal clutch 26 is disengaged and therefore the drive shaft 41 of the transmission 13 is not rotating. At this time, the movable sheave 43 of the drive pulley 40 and the receiver plate 46 are together in a right end position of the drive shaft 41, and the movable sheave 53 of the driven pulley 50 is in a right end position of the driven shaft 51 by the force applied by the pressure-adjusting spring 58. Therefore, the transmission 13 is placed in a state where the effective diameter of the drive pulley 40 is small and the effective diameter of the driven pulley 50 is great, i.e., in a low speed-reduction ratio state.

When the engine speed increases and the centrifugal clutch 26 is engaged, the drive shaft 41 starts to rotate. At this time, the driving power is transmitted from the drive pulley 40 to the driven pulley 50 via the V-belt 60 with a low speed-reduction ratio as described above. When the engine speed further increases, the thrust generated in the sheave thrust generating mechanism 44 increases due to an increase in the centrifugal force in the drive pulley 40, and causes the movable sheave 43 to move to the left in the axial direction of the drive shaft 41. This reduces a distance between the movable sheave 43 and the fixed sheave 42, and hence increases an effective diameter of the drive pulley 40.

As described above, when the sheave thrust in the drive pulley 40 increases, a tension of the V-belt 60 increases, and a wedge force of the V-belt 60 applied to the driven pulley 50 increases. Thereby, the movable sheave 53 of the driven pulley 50 moves to the left in the driven shaft 51, against the spring force applied by the pressure-adjusting spring 58 and the cam thrust generated by the cam tube 55. As a result, a distance between the movable sheave 53 and the fixed sheave 52 increases, and the effective diameter of the driven pulley 50 decreases. Because of the increase in the effective diameter of the drive pulley 40 and the decrease in the effective diameter of the driven pulley 50, the speed-reduction ratio of the transmission 13 decreases gradually, and the vehicle speed increases.

As described above, according to the rotation of the drive pulley 40 and the driven pulley 50, outside air is taken into the transmission case 30 via the air-intake duct 22. The air cools the drive pulley 40, the driven pulley 50, and the V-belt 60. The fins 42*a* provided radially on the fixed sheave 42 of the drive pulley 40 allow the fixed sheave 42 rotating to function as the centrifugal fan, to move the outside air to the outer periphery of the drive pulley 40 as described above.

As described with reference to FIGS. 4 and 5, the air blocking plate 48*d* suppresses the flow of the cooling air in the vicinity of the drive pulley 40 from interfering with the flow of the air in the vicinity of the driven pulley 50. The cooling air in the vicinity of the drive pulley 40 moves around substantially ¾ of the periphery of the drive pulley 40 and then moves rearward along the lower wall portion 33*e* of the transmission case body 33. This flow of cooling air joins the flow of the air in the vicinity of a region below the driven pulley 50. The resulting cooling air moves around substantially half of the periphery of the driven pulley 50 and thereafter is discharged into the air discharge duct 23.

That is, in the transmission 13 of the present embodiment, the air blocking plate provided between the drive pulley 40 and the driven pulley 50 suppresses interference between the flow of the air in the vicinity of the drive pulley 40 and the flow of the air in the vicinity of the driven pulley 50, and the flow (A1 shown in FIG. 4) of the air in the vicinity of the drive pulley 40 is intensified, thereby forming a main flow (A2) of the cooling air directed toward the driven pulley 50. After the flow (A3) of the cooing air moves around the periphery of the driven pulley 50, the cooling air is discharged to outside the case. Therefore, the overall cooling efficiency of the drive pulley 40, the driven pulley 50 and the V-belt 60 can be enhanced.

In the present embodiment, since the driven pulley 50 has no fins, unlike the drive pulley 40, only a relatively weak air flow moving according to the rotation of the driven pulley 50 is generated in the vicinity of the driven pulley 50. This makes it possible to effectively suppress interference between the flow of the cooling air in the vicinity of the driven pulley 50 and the flow of the cooling air in the vicinity of the drive pulley 40 serving as the centrifugal fan. The fact that the driven pulley 50 has no fins has advantages that an increase in a friction resistance of the air can be lowered and a driving loss can be reduced.

The fact that the driven pulley 50 has no fins has an advantage of cost reduction. In addition, in the present embodiment, the air blocking plate 48d is provided unitarily with the air guide plate 48 for guiding the cooling air to the air entrance on the back surface of the drive pulley 40, which also result in cost reduction.

Other Embodiments

The above embodiment is merely exemplary, and is in no way intended to limit the present invention, its applications and uses. Although in the transmission 13 of the present embodiment, the drive pulley 40 and the driven pulley 50 are arranged at the front and at the rear, respectively, for example, the present invention is not limited to this. The two pulleys 40 and 50 may be arranged in the upward and downward direction (vertical direction), or in the rightward and leftward direction.

Although in the above described embodiment, the air inlet 31 and the air outlet 32 are provided on the transmission case body 33, at least one of them may be provided on the transmission cover 34. When the air inlet 31 and the air outlet 32 are provided on the transmission case body 33 or the transmission case cover 34, it is unnecessary to provide the air inlet 31 at the front portion thereof and the air outlet 32 at the rear portion thereof as in the above described embodiment.

For example, the air outlet 32 may be provided at the lower portion of the rear wall portion 33c or the vertical center portion of the rear wall portion 33c, instead of the upper portion of the rear wall portion 33c, in the transmission case body 33. In any case, the air outlet 32 is preferably tilted in the forward direction of the rotational direction of the driven pulley 50, like the present embodiment, but need not be tilted in this way.

Although in the present embodiment, the guide rib 33g for guiding the flow of the cooling air in the vicinity of the driven pulley 50 toward the air outlet 32 is provided unitarily with the bottom wall portion 33a of the transmission case body 33, it may be mounted to the transmission case 30 as a separable member, or may be omitted.

The position, size, shape and the like of the air blocking plate 48d disclosed in the present embodiment are merely exemplary. Other positions, sizes, shapes and the like of the air blocking plate 48d may be used so long as the air blocking plate 48d can intensify the flow of the cooling air formed in the vicinity of the drive pulley 40 and suppress interference with the flow of the air in the vicinity of the driven pulley 50.

As described with reference to FIG. 4, for example, desirably, the air blocking plate 48d is positioned at the forward side in the rotational direction of the drive pulley 40 relative to the imaginary line segment V connecting the center axis 41a of the drive pulley 40 to the center axis 51a of the driven pulley 50, between the drive pulley 40 and the driven pulley 50, and surrounds the outer periphery of the drive pulley 40 over an angular range of at least 45 degrees, when viewed in the axial direction of the drive shaft 41.

In that case, the end portion of the air blocking plate 48d at the forward side in the rotational direction of the drive pulley 40 may be distant from the peripheral wall portion (upper wall portion 33d in the present embodiment) of the transmission case body 33, or the end portion of the air blocking plate 48d at a rearward side in the rotational direction of the drive pulley 40 may be positioned at the rearward side in the rotational direction of the drive pulley 40 relative to the imaginary line segment V.

In the present embodiment, the driven pulley 50 has no fins, to prevent a strong air flow from being generated in the vicinity of the driven pulley 50. The present invention is not limited to this, and the driven pulley 50 may have fins so long as it does not disturb the flow of the cooling air from the drive pulley 40.

Although in the present embodiment, the belt-type continuously variable transmission 13 incorporated into the utility vehicle 1 has been described, the transmission 13 may be incorporated into vehicles such as ATVs (all terrain vehicles) or motorcycles, for example, as well as utility vehicles. These vehicles may be hybrid vehicles or electric vehicles rather than gasoline vehicles.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A belt-type continuously variable transmission comprising:
 a drive pulley assembly mounted to a drive shaft;
 a driven pulley assembly mounted to a driven shaft;
 a belt wrapped around the drive pulley assembly and the driven pulley assembly; and
 a case assembly for accommodating the drive pulley assembly, the driven pulley assembly, and the belt;
 wherein the drive pulley assembly has fins for generating a flow of air moving toward an outer periphery of the drive pulley assembly according to a rotation of the drive pulley assembly, the fins positioned on a surface at one side of the drive pulley assembly in an axial direction;
 the case assembly includes a peripheral wall portion surrounding the drive pulley assembly, the driven pulley assembly, and the belt; and
 when viewed in an axial direction of the drive shaft, an air blocking plate is positioned on a forward side of an imaginary line segment relative to a rotational direction of the drive pulley assembly, the imaginary line segment beginning at a center axis of the drive pulley assembly and ending at a center axis of the driven pulley assembly, the air blocking plate being positioned between the drive pulley assembly and the driven pulley assembly such that the air blocking plate has a circular-arc shape partially covering the outer periphery of the drive pulley assembly, the air blocking plate being disposed in the case assembly so as to be positioned away from the belt in the axial direction toward the fins and so as to face the fins of the drive pulley assembly in a radial direction of the drive shaft.

2. The belt-type continuously variable transmission according to claim 1,
wherein when viewed in the axial direction of the drive shaft, the air blocking plate is curved such that the air blocking plate is gradually closer to the peripheral wall portion of the case assembly in a forward direction of the rotational direction of the drive pulley assembly and an inclination angle of the air blocking plate with respect to the peripheral wall portion decreases gradually.

3. The belt-type continuously variable transmission according to claim 1,
wherein the air blocking plate is integral with a component of the case assembly.

4. The belt-type continuously variable transmission according to claim 1,
wherein the air blocking plate is independent of a component of the case assembly and is mounted to the case assembly.

5. The belt-type continuously variable transmission according to claim 4,
wherein an annular air guide plate having an air entrance on an inner peripheral portion thereof is provided to face the surface of the drive pulley assembly at one side in the axial direction of the drive shaft, and the air blocking plate is provided integrally with the annular air guide plate to extend along an outer periphery of the annular air guide plate;
the annular air guide plate has a greater outer diameter than the drive pulley assembly; and
the air blocking plate is formed by bending an outer periphery of the annular air guide plate.

6. The belt-type continuously variable transmission according to claim 1,
wherein the peripheral wall portion of the case assembly includes a drive-side peripheral wall portion surrounding substantially half of the outer periphery of the drive pulley assembly, a driven-side peripheral wall portion surrounding substantially half of an outer periphery of the driven pulley assembly, and an intermediate peripheral wall portion connecting the drive-side peripheral wall portion to the driven-side peripheral wall portion; and
the driven-side peripheral wall portion is provided with an air outlet which opens to face an outer periphery of the driven pulley assembly and which extends radially outward relative to the driven pulley assembly such that the air outlet is tilted in a forward direction of a rotational direction of the driven pulley assembly.

7. The belt-type continuously variable transmission according to claim 6,
wherein the air outlet is provided to include a region extending from an end portion of the driven-side peripheral wall portion at a forward side in the rotational direction of the driven pulley assembly to the intermediate peripheral wall portion continuous with the end portion of the driven-side peripheral wall portion.

8. The belt-type continuously variable transmission according to claim 6,
wherein the drive pulley assembly and the driven pulley assembly are arranged in a forward and rearward direction; and
the air outlet is provided on an upper portion of the peripheral wall portion of the case assembly.

9. The belt-type continuously variable transmission according to claim 6,
wherein the case assembly is provided with a rib for guiding a flow of cooling air in a vicinity of the driven pulley assembly to the air outlet.

10. The belt-type continuously variable transmission according to claim 9,
wherein when viewed in an axial direction of the driven shaft, the rib is curved such that the rib is gradually closer to the peripheral wall portion of the case assembly in the forward direction of the rotational direction of the driven pulley assembly and an inclination angle of the rib with respect to the peripheral wall portion increases gradually.

\* \* \* \* \*